United States Patent
Murthy (10) Patent No.: US 11,416,577 B2
(45) Date of Patent: *Aug. 16, 2022

(54) MANAGING COMPOUND XML DOCUMENTS IN A REPOSITORY

(71) Applicant: Oracle International Corporation, Redwood Shores, CA (US)

(72) Inventor: Ravi Murthy, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,951

(22) Filed: Apr. 30, 2020

(65) Prior Publication Data

US 2020/0342044 A1    Oct. 29, 2020

Related U.S. Application Data

(63) Continuation of application No. 14/873,748, filed on Oct. 2, 2015, now Pat. No. 10,650,080, which is a
(Continued)

(51) Int. Cl.
*G06F 40/131* (2020.01)
*G06F 40/134* (2020.01)
(Continued)

(52) U.S. Cl.
CPC ........ *G06F 16/986* (2019.01); *G06F 16/2393* (2019.01); *G06F 16/835* (2019.01);
(Continued)

(58) Field of Classification Search
CPC .. G06F 40/131; G06F 40/134; G06F 16/2393; G06F 40/143; G06F 40/154
See application file for complete search history.

(56) References Cited

U.S. PATENT DOCUMENTS

| | | | |
|---|---|---|---|
| 5,303,379 A | 4/1994 | Khoyi | |
| 5,832,527 A | 11/1998 | Kawaguchi | |

(Continued)

OTHER PUBLICATIONS

Murthy,U.S. Appl. No. 14/873,748, filed Oct. 2, 2015, Office Action, dated Aug. 21, 2017.
(Continued)

*Primary Examiner* — Benjamin Smith
(74) *Attorney, Agent, or Firm* — Hickman Becker Bingham Ledesma LLP (57) ABSTRACT

A declarative mechanism is used to manage large documents within a repository. The large documents are sectioned into subdocuments that are linked together by a parent document. The combination of the parent document and subdocument is referred to as a compound document. There are multiple options for configuring rules to break up a source document into a compound document and naming the subdocuments. The compound documents may be queried using statements that treat the compound document as a single XML document, or the parent document of a subdocument may be queried and treated independently. Access control and versioning can be applied at the finer granularity of the subdocument.

20 Claims, 3 Drawing Sheets

Related U.S. Application Data continuation of application No. 11/807,939, filed on May 29, 2007, now Pat. No. 9,183,321.

(60) Provisional application No. 60/829,652, filed on Oct. 16, 2006.

(51) Int. Cl.

| | | |
|---|---|---|
| *G06F 40/154* | (2020.01) | |
| *G06F 40/143* | (2020.01) | |
| *G06F 16/958* | (2019.01) | |
| *G06F 16/93* | (2019.01) | |
| *G06F 16/835* | (2019.01) | |
| *G06F 16/955* | (2019.01) | |
| *G06F 16/23* | (2019.01) | |
| *G06F 16/957* | (2019.01) | |

(52) U.S. Cl.
CPC .......... *G06F 16/94* (2019.01); *G06F 16/9558* (2019.01); *G06F 16/9577* (2019.01); *G06F 40/131* (2020.01); *G06F 40/134* (2020.01); *G06F 40/143* (2020.01); *G06F 40/154* (2020.01)

(56) References Cited

U.S. PATENT DOCUMENTS

| | | | |
|---|---|---|---|
| 5,999,942 A | 12/1999 | Talati | |
| 6,314,425 B1 | 11/2001 | Serbinis | |
| 6,430,563 B1 | 8/2002 | Fritz | |
| 6,446,093 B2 | 9/2002 | Tabuchi | |
| 6,538,673 B1 | 3/2003 | Maslov | |
| 6,578,078 B1 | 6/2003 | Smith | |
| 6,596,030 B2 | 7/2003 | Ball | |
| 6,857,102 B1 | 2/2005 | Bickmore | |
| 6,871,321 B2 | 3/2005 | Wakayama | |
| 6,925,599 B2 | 8/2005 | Wood | |
| 6,941,510 B1 | 9/2005 | Ozzie | |
| 6,947,940 B2* | 9/2005 | Anderson | G06F 16/10 |
| | | | 709/227 |
| 6,973,458 B1 | 12/2005 | Maeda | |
| 6,993,527 B1 | 1/2006 | Raman | |
| 7,036,076 B2 | 4/2006 | Anwar | |
| 7,103,604 B2 | 9/2006 | Maeda | |
| 7,103,915 B2 | 9/2006 | Redlich | |
| 7,134,071 B2 | 11/2006 | Ohwada | |
| 7,143,181 B2 | 11/2006 | Koka | |
| 7,210,097 B1 | 4/2007 | Clarke | |
| 7,210,100 B2 | 4/2007 | Berger | |
| 7,275,066 B2 | 9/2007 | Priestley | |
| 7,281,206 B2* | 10/2007 | Schnelle | G06F 16/86 |
| | | | 715/239 |
| 7,290,205 B2 | 10/2007 | Moncsko | |
| 7,369,260 B2 | 5/2008 | Buschi | |
| 7,398,466 B2 | 7/2008 | Jeon | |
| 7,430,711 B2 | 9/2008 | Rivers-Moore | |
| 7,433,870 B2 | 10/2008 | Chan | |
| 7,461,158 B2 | 12/2008 | Rider | |
| 7,484,171 B2 | 1/2009 | Jeon | |
| 7,491,074 B1 | 2/2009 | Lai | |
| 7,509,306 B2 | 3/2009 | Boettiger | |
| 7,529,726 B2 | 5/2009 | Teng | |
| 7,530,014 B2 | 5/2009 | Abe | |
| 7,539,985 B2 | 5/2009 | Marvin | |
| 7,555,564 B2 | 6/2009 | Gimson | |
| 7,581,177 B1 | 8/2009 | Mollicone | |
| 7,610,304 B2 | 10/2009 | Jain | |
| 7,610,315 B2 | 10/2009 | Chang | |
| 7,650,324 B2 | 1/2010 | Dhairyawan | |
| 7,669,114 B2 | 2/2010 | Wood | |
| 7,672,946 B2 | 3/2010 | Kudo | |
| 7,673,235 B2 | 3/2010 | Bailey | |
| 7,711,702 B2* | 5/2010 | Smolen | G06F 16/2308 |
| | | | 707/715 |
| 7,721,193 B2 | 5/2010 | Upton | |
| 7,735,062 B2 | 6/2010 | De Seabra e Melo | |
| 7,752,632 B2 | 7/2010 | Villaron | |
| 7,793,216 B2 | 9/2010 | Hale | |
| 7,797,310 B2 | 9/2010 | Idicula | |
| 7,805,452 B2 | 9/2010 | Kano | |
| 7,827,177 B2 | 11/2010 | Murthy | |
| 7,836,078 B2 | 11/2010 | Dettinger | |
| 7,913,172 B2 | 3/2011 | Rjaibi | |
| 7,933,935 B2 | 4/2011 | Idicula | |
| 7,937,398 B2 | 5/2011 | Murthy | |
| 7,954,048 B2 | 5/2011 | Gauthier | |
| 8,010,887 B2 | 8/2011 | Soria | |
| 8,082,266 B2 | 12/2011 | Boettiger | |
| 8,250,468 B2* | 8/2012 | Harrington | G06F 40/131 |
| | | | 715/234 |
| 8,271,428 B2 | 9/2012 | Hacigumus | |
| 8,341,514 B2* | 12/2012 | Westerinen | G06F 16/986 |
| | | | 707/999.102 |
| 8,347,313 B2 | 1/2013 | Hare | |
| 8,356,053 B2 | 1/2013 | Murthy | |
| 8,756,490 B2* | 6/2014 | Horiuchi | G06F 40/143 |
| | | | 715/255 |
| 8,775,933 B2* | 7/2014 | Harrington | G06F 40/131 |
| | | | 715/277 |
| 8,984,397 B2* | 3/2015 | Harrington | G06F 40/131 |
| | | | 715/239 |
| 9,183,321 B2 | 11/2015 | Murthy | |
| 9,460,060 B2* | 10/2016 | Harrington | G06F 40/131 |
| 9,880,980 B2* | 1/2018 | Petri | G06F 40/131 |
| 2002/0059459 A1 | 5/2002 | Koka | |
| 2002/0062325 A1 | 5/2002 | Berger | |
| 2002/0065848 A1 | 5/2002 | Walker | |
| 2002/0091734 A1 | 7/2002 | Redlich | |
| 2002/0099739 A1 | 7/2002 | Fischer | |
| 2002/0120648 A1 | 8/2002 | Ball | |
| 2002/0156803 A1 | 10/2002 | Maslov | |
| 2002/0188638 A1* | 12/2002 | Hamscher | G06Q 10/10 |
| | | | 715/255 |
| 2003/0009563 A1 | 1/2003 | Douglis | |
| 2003/0014384 A1 | 1/2003 | Ewald | |
| 2003/0018650 A1 | 1/2003 | Priestley | |
| 2003/0070143 A1 | 4/2003 | Maslov | |
| 2003/0079180 A1 | 4/2003 | Cope | |
| 2003/0115547 A1* | 6/2003 | Ohwada | G06F 40/197 |
| | | | 715/229 |
| 2003/0177443 A1* | 9/2003 | Schnelle | G06F 16/86 |
| | | | 715/227 |
| 2003/0189593 A1 | 10/2003 | Yarviin | |
| 2003/0237052 A1 | 12/2003 | Danielsson | |
| 2004/0068509 A1 | 4/2004 | Garden | |
| 2004/0068696 A1 | 4/2004 | Seyrat | |
| 2004/0083479 A1 | 4/2004 | Bondarenko | |
| 2004/0088332 A1 | 5/2004 | Lee | |
| 2004/0088652 A1 | 5/2004 | Abe | |
| 2004/0107214 A1 | 6/2004 | Hung | |
| 2004/0122831 A1 | 6/2004 | Ha | |
| 2004/0148567 A1 | 7/2004 | Jeon | |
| 2004/0193607 A1 | 9/2004 | Kudo | |
| 2004/0194016 A1 | 9/2004 | Liggitt | |
| 2004/0230576 A1 | 11/2004 | Hillberg | |
| 2004/0237035 A1 | 11/2004 | Cummins | |
| 2005/0041040 A1 | 2/2005 | Fukuda | |
| 2005/0052692 A1 | 3/2005 | Buschi | |
| 2005/0076030 A1 | 4/2005 | Hada | |
| 2005/0091581 A1 | 4/2005 | Bezrukov | |
| 2005/0114692 A1 | 5/2005 | Watson | |
| 2005/0120298 A1 | 6/2005 | Petrujkic | |
| 2005/0125395 A1* | 6/2005 | Boettiger | G06F 16/951 |
| 2005/0149729 A1 | 7/2005 | Zimmer | |
| 2005/0177543 A1 | 8/2005 | Chen | |
| 2005/0177784 A1 | 8/2005 | Andrews | |
| 2005/0193382 A1 | 9/2005 | Goring | |
| 2005/0228728 A1 | 10/2005 | Stromquist | |
| 2005/0256893 A1 | 11/2005 | Perry | |
| 2005/0257201 A1* | 11/2005 | Rose | G06F 16/80 |
| | | | 717/136 |

(56) References Cited

U.S. PATENT DOCUMENTS

| | | | |
|---|---|---|---|
| 2005/0262129 A1* | 11/2005 | Hacigumus | G06F 16/86 707/999.102 |
| 2005/0278289 A1 | 12/2005 | Gauweiler | |
| 2005/0278616 A1 | 12/2005 | Eller | |
| 2005/0289446 A1 | 12/2005 | Moncsko | |
| 2006/0004780 A1 | 1/2006 | Maeda | |
| 2006/0031411 A1 | 2/2006 | Gimson | |
| 2006/0095834 A1 | 5/2006 | Jeon | |
| 2006/0117014 A1 | 6/2006 | Qi | |
| 2006/0136827 A1 | 6/2006 | Villaron | |
| 2006/0137019 A1 | 6/2006 | Dettinger | |
| 2006/0143177 A1 | 6/2006 | Idicula | |
| 2006/0143557 A1* | 6/2006 | Chan | G06F 21/6245 715/239 |
| 2006/0143558 A1 | 6/2006 | Albornoz | |
| 2006/0168513 A1 | 7/2006 | Coulson | |
| 2006/0173999 A1 | 8/2006 | Rider | |
| 2006/0184867 A1 | 8/2006 | Shpigel | |
| 2006/0259854 A1* | 11/2006 | Walker | G06F 40/131 715/234 |
| 2007/0028162 A1 | 2/2007 | Griffin | |
| 2007/0043666 A1 | 2/2007 | Burdette | |
| 2007/0043686 A1* | 2/2007 | Teng | G06F 16/83 |
| 2007/0044012 A1 | 2/2007 | Suver | |
| 2007/0050403 A1* | 3/2007 | Dhairyawan | G06F 40/10 |
| 2007/0094286 A1 | 4/2007 | Murthy | |
| 2007/0130157 A1 | 6/2007 | Jain | |
| 2007/0136662 A1 | 6/2007 | Khaba | |
| 2007/0143320 A1 | 6/2007 | Gaurav | |
| 2007/0143610 A1 | 6/2007 | Machiraju | |
| 2007/0150809 A1 | 6/2007 | Yoshida | |
| 2007/0156743 A1* | 7/2007 | Harrington | G06F 40/131 707/999.102 |
| 2007/0156768 A1 | 7/2007 | Harrington | |
| 2007/0174486 A1 | 7/2007 | Holstege | |
| 2007/0203931 A1 | 8/2007 | Ukelson | |
| 2007/0236742 A1* | 10/2007 | Hale | G06F 40/131 358/3.13 |
| 2007/0260650 A1 | 11/2007 | Warner | |
| 2007/0260971 A1 | 11/2007 | Rivas | |
| 2007/0271523 A1 | 11/2007 | Lacey | |
| 2007/0283246 A1 | 12/2007 | Wake | |
| 2007/0299969 A1 | 12/2007 | Kunitake | |
| 2008/0005132 A1 | 1/2008 | Herbeck | |
| 2008/0005138 A1 | 1/2008 | Gauthier | |
| 2008/0005194 A1* | 1/2008 | Smolen | G06F 16/2308 |
| 2008/0005659 A1 | 1/2008 | Fujimaki | |
| 2008/0018925 A1 | 1/2008 | Smithson | |
| 2008/0021916 A1 | 1/2008 | Schnelle | |
| 2008/0059448 A1 | 3/2008 | Chang | |
| 2008/0065671 A1 | 3/2008 | Dejean | |
| 2008/0072141 A1 | 3/2008 | Hodel-Widmer | |
| 2008/0077606 A1* | 3/2008 | Fang | H03M 7/30 |
| 2008/0077850 A1 | 3/2008 | Gauthier | |
| 2008/0080017 A1 | 4/2008 | Ishizuka | |
| 2008/0091623 A1 | 4/2008 | Idicula | |
| 2008/0091693 A1 | 4/2008 | Murthy | |
| 2008/0091703 A1 | 4/2008 | Murthy | |
| 2008/0091714 A1 | 4/2008 | Idicula | |
| 2008/0092037 A1 | 4/2008 | Medi | |
| 2008/0140705 A1 | 6/2008 | Luo | |
| 2008/0183736 A1 | 7/2008 | Westerinen | |
| 2008/0222516 A1 | 9/2008 | Petri | |
| 2008/0256092 A1* | 10/2008 | Kano | G06F 40/131 |
| 2008/0319954 A1 | 12/2008 | Boettiger | |
| 2008/0319999 A1 | 12/2008 | Simpson | |
| 2009/0063951 A1 | 3/2009 | Rjaibi | |
| 2009/0070295 A1 | 3/2009 | Otomori | |
| 2009/0178019 A1 | 7/2009 | Bahrs | |
| 2010/0070844 A1 | 3/2010 | Aymeloglu | |
| 2011/0047193 A1 | 2/2011 | Murthy | |
| 2012/0096346 A1 | 4/2012 | Sylthe | |
| 2016/0026731 A1 | 1/2016 | Murthy | |

OTHER PUBLICATIONS

Murthy, U.S. Appl. No. 14/873,748, filed Oct. 2, 2015, Final Office Action, dated Jan. 25, 2018.
Murthy, U.S. Appl. No. 14/873,748, filed Oct. 2, 2015, Office Action, dated Jun. 27, 2019.
Murthy, U.S. Appl. No. 14/873,748, filed Oct. 2, 2015, Office Action, dated Jun. 15, 2018.
Murthy, U.S. Appl. No. 14/873,748, filed Oct. 2, 2015, Notice of Allowance, dated Jan. 13, 2020.
Murthy, U.S. Appl. No. 14/873,748, filed Oct. 2, 2015, Final Office Action, dated Jan. 14, 2019.
Kim et al., "Device-Independent Web Browsing Based on CC/PP and Annotaion", Interacting with Computers, vol. 18, Issue 2, dated Mar. 1, 2006, pp. 283-303.

* cited by examiner

MANAGING COMPOUND XML DOCUMENTS IN A REPOSITORY

RELATED APPLICATIONS

This application is a Continuation of U.S. patent application Ser. No. 14/873,748, filed Oct. 2, 2015, which is a Continuation of U.S. patent application Ser. No. 11/807,939, filed May 29, 2007, which claims priority to U.S. Provisional Application No. 60/829,652 filed on Oct. 16, 2006, the entire contents of both of which are incorporated herein by reference for all purposes as if fully set forth herein. The Applicant hereby rescinds any disclaimer of claim scope in the parent applications or the prosecution history thereof and advises the USPTO that the claims in this application may be broader than any claim in the parent applications.

TECHNICAL FIELD

The present invention relates to managing large XML documents.

BACKGROUND

XML documents are being increasingly stored and managed within content repositories. These content repositories are typically based on a database system and offer file system abstractions such as foldering, access control, versioning and protocol access.

The size of the individual XML documents has also been growing. XML documents can be as large as multi-megabytes and are expected to grow significantly over time.

For large documents, it may be desirable to apply different access control policies for different parts of the document. For example, in the case of a XML document representing a book, the editor may have write access on the entire book whereas individual writers can only update their assigned chapters. However, since access control in a repository may only be provided at the document level, it is difficult to provide access control level of a granularity lower than the document level.

Similar issues with granularity afflict other repository functions. With respect to versioning, only an entire document, rather than a portion thereof, may need to be versioned. When only a small part of a document changes to create a new version of the document, an entire new version of the document is created. Similarly, when updating a small portion of a large document, the entire document is overwritten.

Clearly, there is need for a mechanism that addresses these problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a declarative mechanism to manage large documents within a repository. The large documents are sectioned into subdocuments that are linked together by a parent document. The combination of the parent document and subdocuments is referred to as a compound document. There are multiple options for configuring rules to break up a source document into a compound document and naming the subdocuments. The compound documents may be queried using statements that treat the compound document as a single XML document, or the parent document and subdocuments may be queried and treated independently. Access control and versioning can be applied at the finer granularity of the subdocument.

Providing such a declarative mechanism that configures how compound documents are managed in the repository has advantages over other possible techniques, such as the application custom code approach, which requires applications of the repository to be programmed with logic that handles compound documents. In the application custom code approach, developers develop complicated procedural code. However, using declarative mechanisms described herein, developers can control how compound documents are managed using a much easier to program declarative mechanism. The declarative mechanism makes the repository aware of the relationship between the documents that comprise a compound document, and thus can ensure that the documents are processed in a way that is consistent with the relationship. Finally, the programmed logic that manages compound documents is consistent across all applications.

Illustrative Repository

A repository is a computer system that stores and manages access to resources. Specifically, a repository is a combination of integrated software components and an allocation of computational resources, such as memory, disk storage, a computer, and processes on the node for executing the integrated software components on a processor, the combination of the software and computational resources being dedicated to managing storage and access to resources.

A resource is a data source. The term resource encompasses a broad range of kinds of data sources. A resource can simply be a file, and/or, importantly, an XML document, which can be stored in a file or stored in the tables of an object-relational database system. A resource may also be a CGI script, that, when executed, dynamically generates data.

Similar to a hierarchical file system, resources in a repository are organized according to a hierarchy referred to herein as a resource hierarchy. Each resource may be located, identified, or addressed by tracing a "path" through the hierarchy to the resource. For a given resource, a path begins at a root directory and proceeds down a hierarchy of directories to eventually arrive at the directory that contains the resource. A repository may associate more than one path with a resource.

A repository is typically part of an n-tier system, where the repository is in the first tier and one or more applications are in the outer tier. An application, as the term is used herein, is a unit of software that is configured to interact with and use the functions of a repository. In general, applications are comprised of integrated functions and software modules (e.g. programs comprised of machine executable code or interpretable code, dynamically linked libraries) that perform a set of related functions. The applications are configured to interact with a repository by establishing a connection to the repository through one or more interface components configured for interfacing to the repository. Often, but not necessarily, an application and repository are located on different computers; the connection to the repository includes a network connection to the repository.

Figure 1:
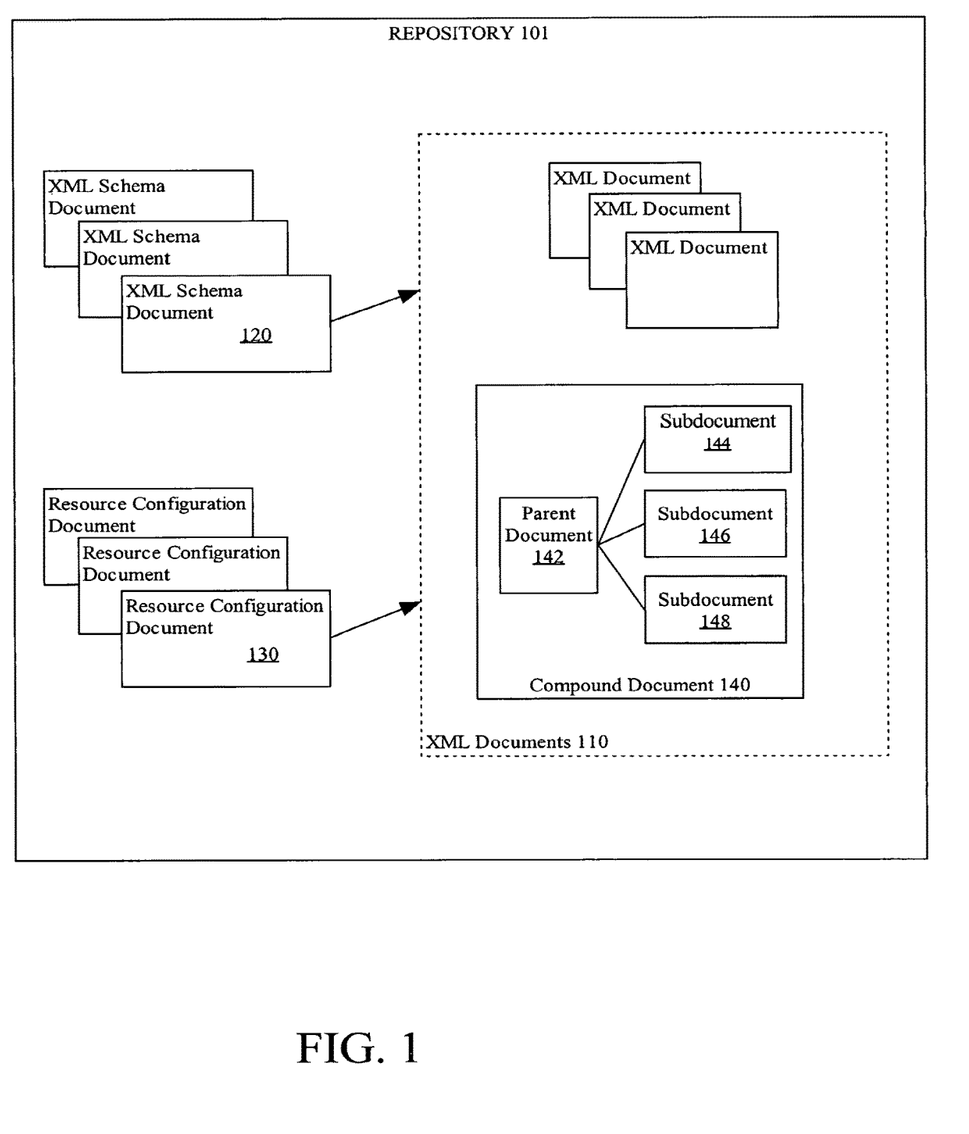
FIG. 1 is a diagram depicting a repository that stores compound documents according to an embodiment of the present invention.

FIG. 1 shows a repository that may be used to implement an embodiment of the present invention. Referring to FIG. 1, it depicts repository 101, which stores XML documents 110. XML documents can be stored in structures within or outside of a database, in any form, such as CLOB (character LOB storing the actual XML text), O—R (object relational structured form in the presence of an XML schema), or BLOB (binary LOB storing some binary form of the XML data).

XML schema documents 120 define the structure of at least a portion of XML documents 110. A format and standard for an XML schema document is XML Schema.

A repository stores XML documents in base structures that comprise an "internal representation" of the XML document. The base structures are comprised of structures having a datatype recognized by repository 101. Different examples of base structures that repository 101 might use are object-relational storage (tables, columns, objects and object attributes), LOB, CLOB, and BLOB.

According to an embodiment, at least some of XML schema documents 120 are registered with repository 101. When an XML schema is registered, the database system determines an internal representation and stores instances of the XML schema within the base structures of the internal representation. When an XML document is received by repository 101 to be stored as an instance of the XML schema, repository 101 may validate the XML document to determine whether the document conforms to the XML schema.

Resource configurations 130 are units of declarative instructions that can be supplied, at least in part, by a user to the repository and is associated with a set of resources, such as resources that reside in a particular directory. Each resource configuration contains one or more configuration items that each declaratively define and/or expresses one or more rules for managing a resource associated with a resource configuration.

Compound documents may be accessed in repository 101 by issuing a query to repository 101. In an embodiment, the queries are statements that comply with one or more query languages, such as SQL, SQL/XML, or XQuery, or a combination thereof.

The term query as used herein refers broadly to any statement issued to repository 101 to access or change resources stored therein. Query statements that specify changes or modifications or creation of resources are referred to herein as DML (Data manipulation language) statements. Such operations are referred to herein as DML operations.

Compound Document

Among XML schema documents 120 is compound document 140. A compound document is an XML document that is composed of other XML documents.

As the term is used herein, an XML document is a set of elements that conform to XML, and that is a unit that may be identified and addressed by a resource path expression. A resource path consists only of directories and/or nodes within a resource hierarchy. The resource path does not include any element within an XML document. Parts of an XML document may be identified by, for example, a XPath expression based on the hierarchy of elements in the XML document. Thus a particular part of an XML document may be identified by a resource path expression and XPath expression. An XML document may or may not conform to the Document Object Model promulgated by the W3C.

Compound document 140 comprises a logical or parent XML document ("parent XML document") that contains subdocument links to subdocuments. Specifically, compound document 140 includes parent document 142 and subdocuments 144, 146, and 148. In general, subdocument links are data embedded in a parent document to identify a subdocument of the parent document.

According to an embodiment, a parent XML document includes subdocument links in the form of a linking element, which uses attributes and elements in the XInclude namespace, defined by the W3C standard for representing linking relationships between documents. (See XML Inclusions (XInclude) Version 1.0 (Second Edition W3C Recommendation 15 Nov. 2006) The following XML fragment XInclude XI A illustrates such a linking element.

XInclude XI

```
<book xmlns:xi="http://www.w3.org/2001/XInclude">
    <xi:include href="frontmatter.xml"/>
    <xi:include href="part1.xml"/>
    <xi:include href="part2.xml"/>
    <xi:include href="part3.xml"/>
    <xi:include href="backmatter.xml"/>
</book>
```

The link element <book> references the namespace XInclude and includes five "xi:include" elements, each containing an attribute referencing a subdocument. The subdocuments are frontmatter.xml, part1.xml, part3.xml, and backmatter.xml.

As mentioned earlier, compound document declarations declaratively specify how a repository processes compound documents. According to an embodiment, compound document declarations may be included within a resource configuration or as annotations within an XML schema document.

Creating a Compound Document

Compound documents can be created explicitly or implicitly. In the explicit approach, a parent document containing a linking element is submitted to the repository by an application and/or user. For example, an application supplies the parent document and subdocuments, with the parent document already containing the subdocument links to the subdocuments. This feature allows the application to not only shred a source document into parent document and subdocuments but also to make repository 101 aware that these XML, documents comprise a compound document.

In the implicit approach, a compound document is created by shredding a document into a parent document and subdocument according to shredding instructions. Shredding instructions are compound document declarations that specify how to create compound document from a source document. Shredding instructions may also specify how to create a resource path and/or name for the subdocument. Like compound document declarations in general, shredding instructions may be specified by users in various ways. Two such ways are to include shredding instructions in a resource configuration and/or a XML schema, as illustrated below by the following XML fragments.

Resource Configuration Fragment RC

```
<SectionConfig>
    <SectionPath value="//chapter" section="document"
        documentPath="concat("chapters/chap",
        chapter/@id,".xml"/>...
```

Schema Fragment SF

```
<xs:element ref="chapter" xdb:section="document"
    xdb:documentPath="concat("chapters/chap",
    chapter/@id, ".xml")"/>
```

Resource Configuration Fragment RC

Resource Configuration Fragment RC shows a fragment within an element of a resource configuration. Element <SectionConfig> contains shredding instructions. Within <SectionConfig>, <SectionPath> specifies locations within a source document that contain the content of subdocuments and a resource path and/or name of the document. Specifically, the attribute value is set to the XPath string expression "//chapter", which identifies elements containing subdocument content. Each element identified by the XPath string expression contains the content of a subdocument. The attribute value documentPath is set to a XPath string expression "concat("chapters/chap", chapter/@id, ".xml",)" which, for a particular element identified by the path expression, is an XPath expression that evaluates to a resource path and name of a subdocument.

Schema Fragment SF shows a declaration annotated with shredding instructions for source documents that are instances of the XML schema. The value of attribute ref specifies locations within a source document that contain the content of subdocuments and a path and/or name of the document. Specifically, the attribute value is set to the "chapter", identifying the elements within XML schema instances that contain subdocument content. The attribute value documentPath is set to the XPath string expression "concat("chapters/chap", chapter/@id, ".xml",)" which is a XPath expression that evaluates to a resource path and name of a subdocument.

Creating Compound Documents Based on Shredding Documents

Figure 2:
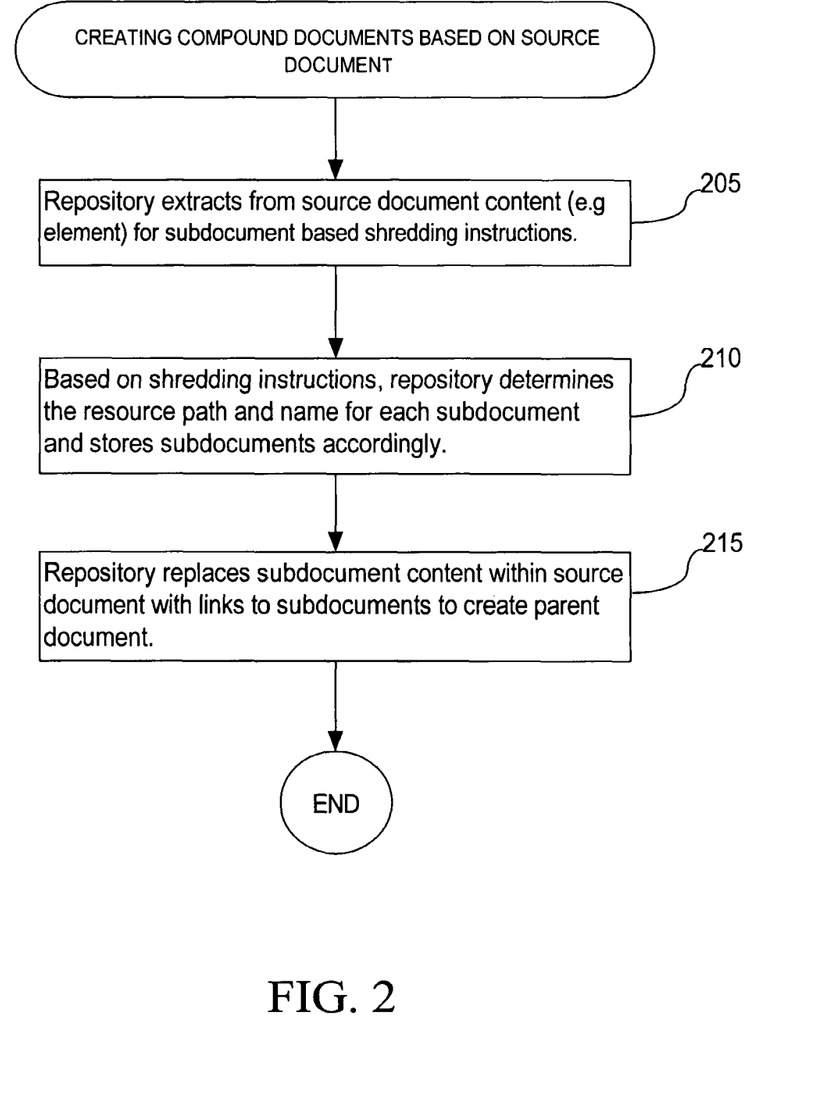
FIG. 2 is a flow chart depicting a procedure for creating a compound document according to an embodiment of the present invention.

FIG. 2 is a flow chart depicting a procedure for creating a compound document from a source document. According to an embodiment, the procedure is performed in response to an application submitting to repository 101 a source document for storing within repository 101.

Referring to FIG. 2, at 205, the repository 101 extracts from the source document the content for subdocuments, based on the shredding instructions. According to an embodiment, repository 101 may determine that the source document is associated with a resource configuration that contains the shredding instructions. For example, a user may specify a directory in which to store the source document. Repository 101 associates the directory and resources it contains with the resource configuration that contains shredding instructions. Repository 101 applies the resource configuration to the resources in the directory, including the shredding rules, in response to a request to store the source document.

In another embodiment, repository 101 determines that the source document specifies an XML schema document of which the source document is an instance. The XML schema document specifies shredding instructions. After validating the source document according to the XML schema, repository 101 applies the shredding rules specified in the XML schema document to generate the compound document.

At 210, repository 101 determines, based on the shredding instructions, the resource path and name of each of the subdocuments for which content was extracted, and creates and stores the subdocuments (with the extracted content) according to the resource path and/or name determined for each subdocument.

At 215, for each subdocument for which content was extracted, repository 101 replaces the content of the subdocument within the source document with a subdocument link to the subdocument. According to an embodiment, the content is replaced with a link element that conforms to XInclude and which refers to the resource path of each subdocument created and stored earlier in the procedure. After the replacement, the source document, as modified becomes a parent document for the compound document.

In another embodiment, a compound document is not created by repository 101 by shredding a source document according to shredding rules. Rather, repository 101 receives the compound document in an explicit mode. For example, an application supplies the parent document and subdocuments, with the parent document already containing the subdocument links to the subdocuments. This feature allows the application itself to shred a source document into a parent document and subdocuments and to make repository 101 aware that these documents comprise a compound document.

Hard, Weak, and Symbolic Linking

According to an embodiment of the present invention, the subdocument link between a parent document and a subdocument may be hard, weak, or symbolic. A hard link is uniquely associated with a subdocument. If the subdocument is moved to another location within repository 101, the hard link between the subdocument is preserved. Also, the integrity of the link is guaranteed. The subdocument cannot be deleted from repository 101 as long as the link exists.

A weak link is similar to a hard link. The subdocument is uniquely associated with the link. However, the integrity of the weak link is not guaranteed like it is for the hard link. Repository 101 does not prevent a subdocument from being deleted from repository 150 even if the parent has a link to it.

A symbolic link is not uniquely associated with a subdocument but is associated with a location e.g. resource path location. The symbolic link links a parent document with the subdocument (or other resource) at that location. Thus, if the subdocument symbolically linked to a parent document is moved to a different location within the repository 101, the symbolic link no longer links the subdocument and parent document, or, in other words, no longer points to the subdocument. However, if another subdocument is moved to the location, then the symbolic link points to the new subdocument thereby linking the new sub document with the parent document.

According to an embodiment, for a hard or weak link between a parent document and subdocument, repository 101 stores a resource identifier that uniquely identifies the subdocument within a resource hierarchy stored in repository 101. The resource identifier is stored within the internal representation of the parent document in association with data representing the parent-document-subdocument link. The resource id of a resource, such as a patent document or subdocument, does not change once the resource is created in repository 101 and when the resource is moved within the repository 101, e.g. the resource path location of the resource is changed by moving it to a different directory.

As an optimization, the resource path string is also stored in association with the parent-document-subdocument link. In an embodiment, the resource path string may be used to access the subdocument more efficiently. The resource path string however, is not maintained when the respective subdocument is moved to another location. When the resource path string is used to access a subdocument, and the subdocument is not found at that location, repository 101 uses the resource id to find the subdocument. When found, the new resource path string is stored to replace the old and no longer valid resource path string.

The particular type of subdocument links (hard, weak and symbolic) to include in the parent document may be declared using compound document declarations. Just as in the case of shredding instructions, such compound document declarations may include elements, attributes, and an XPath string expression to indicate the particular kind of subdocument link to use for particular subdocuments.

Expand_XINCLUDE Operator

An important operation performed on a parent document is expansion. As used herein, the term expand refers to operations in which a subdocument link within a parent document is replaced with the content of a subdocument. Expanding a compound document is an operation that is performed in variety on contexts that require computation of the content, including, computing the result of a query that requests the content, or computing an intermediate result of a query that requires the content. The term expand a compound document and expand a parent document means to expand the subdocuments within the compound or parent document.

Compound documents may be accessed in repository 101 by issuing a query that contains an operator. The operator may be defined by a query language, and takes a parent document as an operand, and returns and/or evaluates to the expanded form of the parent document.

According to an embodiment, such an operator is an EXPAND_XINCLUDE operator, which takes as an operand a reference to a parent document. Path expressions that are applied to the operator reference elements in the parent document and subdocument without having to refer to the resource path of the subdocument. In other words, the path expressions may reference any location within the logical compound document without having to account for or include the resource path of a subdocument. For example, the following query.

select extract(expand_xinclude('book.xml'),
'/chapter/name') from dual;

The above query selects elements from the compound document book. xml identified by the path string/chapter/name. The elements are stored in a subdocument. No reference is made to the resource path of the subdocument.

Other operands of the EXPAND_XINCLUDE operator include operands for specifying which subdocument links to expand. In this way, EXPAND_XINCLUDE may be used to expand only selected subdocument links.

A statement expression or construct for expansion is not limited to any particular type of syntax. Any expression that conforms to a recognizable syntax may be used.

Whether a repository treats a reference to a parent document as reference to the entire compound document may be controlled by user session setting with repository 101. In an embodiment, when a query references a parent document that is not contained in any operator or the like, repository 101 generates and/or returns the expanded form because a session setting specifies to treat references to a parent document as reference to the entire compound document. To prevent and/or control expansion, an operator is used.

Access Control

Access control can be defined at the subdocument level. Compound document declarations for controlling access may be specified as annotations in an XML schema or instructions in a resource configuration, and may specify access control policies at the sub document level. Compound document declarations may define different sets of access privileges for different sets of users for different subdocuments of a compound document. For example, a group of users may be entitled to read an entire compound document. However, only one subgroup of the users may edit certain chapters and another subgroup may edit other chapters. Such a policy may be specified by compound document declarations in a resource configuration or XML schema document, using, for example, specific elements, attributes, and XPath string expressions to declare the particular access control to use for particular subdocuments.

When repository 101 receives a query that includes an expand operator, it only expands those subdocuments to which the compound document declarations permit the required access privilege. Likewise, other types of operations, such as updates or modifications, are similarly controlled.

In addition, compound document declarations may specify error messages to provide when a requested operation is not permitted or is attempted. Such an error message may be specified at both the compound document level and the subdocument level.

Updates to Compound Document

In DML statements issued to a repository to modify a compound document, the statements may either specify updates to the individual parent document or subdocuments of a compound document or updates to the compound document as a whole. In the latter case, the update commands may refer to an expansion operator that operates on a compound document. The following query is an example.

```
update resource_view
    set res =updatexml(expand_xinclude('book.xml'),
        '/chapter/name', 'newname')
    where path ='book.xml'
```

In addition, compound document declarations may specify and control update behavior of a compound document. When updates are made to a compound document, the compound document declarations may specify that the updated version overwrite the old version of a subdocument or that the changes are merged within the subdocument. Such update behavior may be specified at both the compound document level or subdocument level for specific subdocuments.

Versioning

In an embodiment, repository 101 supports versioning of compound documents, at the compound document level and/or subdocument level. A compound document may be modified and stored as another version of the entire compound document. Thus, a new version of the parent document and each subdocument may be stored in a repository when creating a new version of a compound document. Before and after modification, the compound document may be checked in and checked out. In this case, the parent document and each subdocument is checked in and checked out.

Versioning may be formed at the parent and subdocument level. A new version of a parent document may be created independently without creating a new version of any sub document. A version of a parent document may be checked in and checked out without checking in or checking out any subdocument. Likewise, a new version of a subdocument may be created without creating a new version of the parent document and any subdocument. A subdocument may be checked in and checked out without checking in and checking out another subdocument or the parent document.

In addition, the subdocument links may be version independent or version specific. In a version independent link, when a subdocument link is expanded, it is expanded to the current version of a subdocument. Thus, when a compound document is expanded, each subdocument link to a subdocument that is version independent is expanded by returning the most current version of the subdocument.

In a version specific link, the subdocument link refers to a specific version of the document. When a subdocument link is expanded, the specific version referred to is returned. In an embodiment, repository 101 stores a version number in addition to a resource id within the internal representation of the subdocument link.

Compound document declarations may specify whether subdocument links are version independent or specific. This allows a configuration of versioning features that accommodate a variety of scenarios and that may be used in various combinations.

Compound document declarations may declare that a particular version of a compound document incorporate specific versions of subdocuments. For example, a first version of a parent document may incorporate version 5 of subdocument A and version 7 of subdocument B. A second version of the parent document may include version 6 of subdocument A and version 10 of subdocument B. The second version of the parent document retains the version specific links to version 5 of subdocument A and version 7 of subdocument B.

Compound document declarations may declare that a particular version of a compound document have version independent links to subdocuments, or even a combination of version specific and independent links. For example, the first version of a parent document may have a version specific link to version 5 of subdocument A and a version independent link to subdocument B. A second version of the parent document may have a version specific link to version 6 of subdocument A and a version independent link to subdocument B. Thus, the different versions of a compound document represented by the first and second version of the parent document include different versions of subdocument A but the same and latest version of subdocument B.

The particular of type versioning to use for a compound document may be specified by compound document declarations in a resource configuration or XML schema document, using, for example, specific elements, attributes, and XPath string expressions to declare the particular subdocument links (version specific or independent) to use for particular subdocuments and the subdocuments to which they apply.

Hardware Overview

Figure 3:
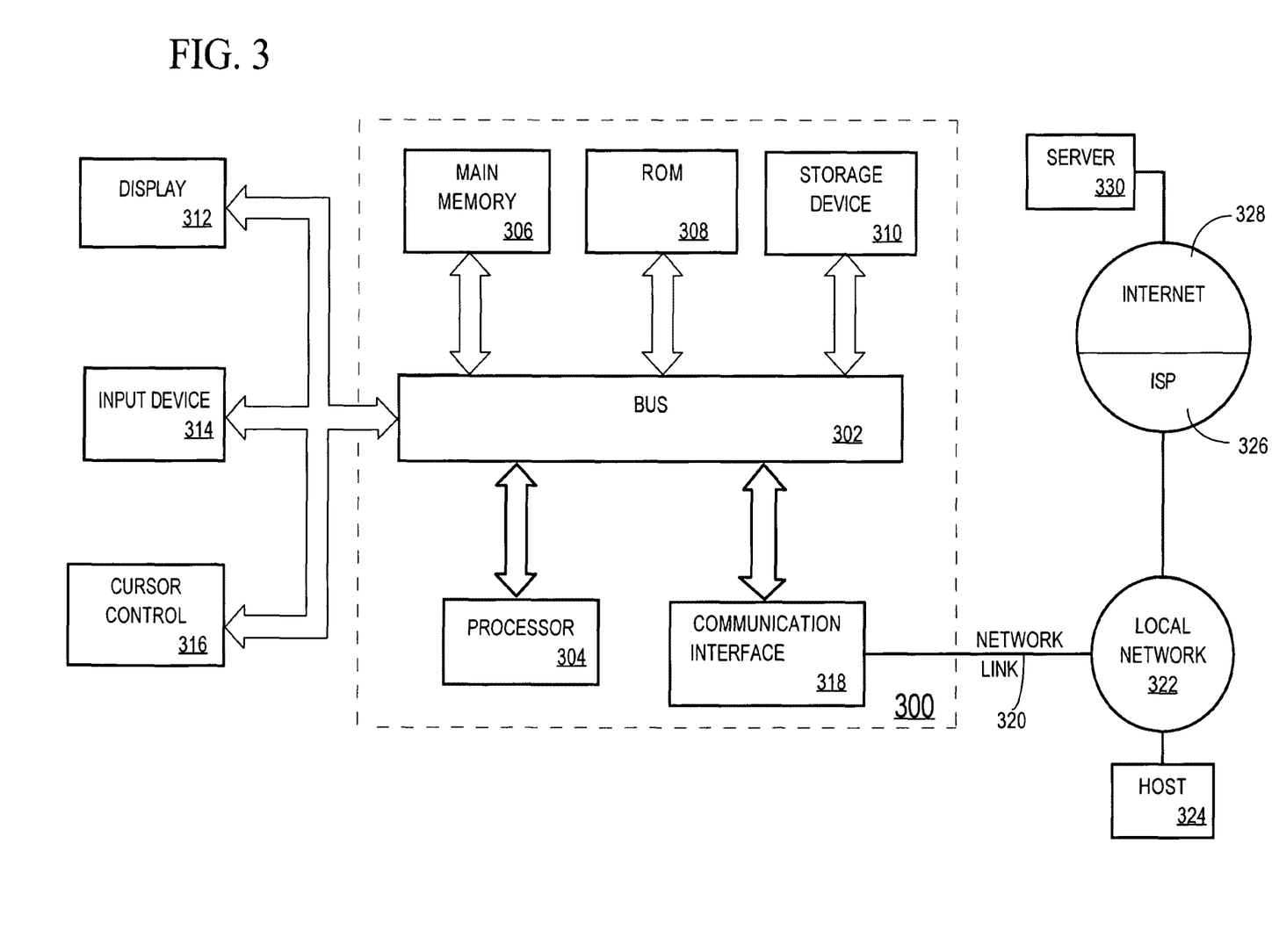
FIG. 3 is a diagram of a computer system that may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   in response to receiving a source document:
   creating, based on the source document, a parent document that is separate from the source document;
   identifying multiple elements within the source document;
   creating a plurality of subdocuments that are separate from the parent document and the source document;
   for each element of the multiple elements:
   storing said each element in a different subdocument of the plurality of subdocuments,
   creating and storing, in the parent document, a link to the different subdocument;
   storing data that identifies the parent document and the plurality of subdocuments as a compound document that is separate from the source document;
   wherein identifying the multiple elements within the source document comprises determining, based on one or more shredding instructions, a location of each element of the multiple elements in the source document;
   wherein storing said each element of the multiple elements in the different subdocument comprises extracting said each element from the source document and storing said each element of the multiple elements at a resource path and a name of a corresponding subdocument, wherein the resource path and name of the corresponding subdocument are included in the one or more shredding instructions;

wherein the resource path comprises directories or nodes in a node hierarchy and does not include any of the multiple elements from the source document;

wherein the method is performed by one or more computing devices.

2. The method of claim 1, wherein identifying the multiple elements comprises using an XML schema associated with the source document to identify the multiple elements.

3. The method of claim 1, further comprising:
storing, within a repository, a plurality of compound documents that includes the compound document, each compound document of the plurality of compound documents including:
  a different parent document,
  a different plurality of subdocuments of the different parent document;
wherein the different parent document includes, for each subdocument of the different plurality of subdocuments, a link to said each subdocument.

4. The method of claim 3, further comprising:
receiving a statement that requires that a particular operation be performed on content stored within a certain subdocument of the plurality of subdocuments; and
based on one or more compound document declarations that are stored separate from the plurality of compound documents, making a determination that the particular operation is not permitted.

5. The method of claim 4, wherein:
one of the one or more compound document declarations specifies an error message; and
the method further comprising displaying the error message in response to the determination.

6. The method of claim 3, further comprising:
storing, in association with a first compound document of the plurality of compound documents, a compound document declaration that declares at least one of the following:
  a first link, to at least one subdocument of a set of first subdocuments of the first compound document, is a hard link, wherein a first particular subdocument to which the hard link points cannot be deleted from the repository as long as the hard link is included in a first parent document, and the link between the first parent document and the first particular subdocument is preserved if the first particular subdocument is moved to another location within the repository; or
  a second link, to at least one subdocument of the set of first subdocuments, is a weak link, wherein a second particular subdocument to which the weak link points can be deleted from the repository even while a second parent document includes the weak link to the second particular subdocument.

7. The method of claim 6, further comprising storing, within a certain link of a certain parent document, a certain resource path to a certain subdocument, wherein the certain link is either the hard link or the weak link.

8. The method of claim 3, further comprising:
storing, in association with a first compound document of the plurality of compound documents, a compound document declaration that declares a first link, to at least one subdocument of a set of first subdocuments, to be a symbolic link, wherein a first parent document that includes the symbolic link is no longer linked to a subdocument to which the symbolic link points if the subdocument is moved to a different location in the repository.

9. The method of claim 3, further comprising:
receiving a statement that requires that a particular operation be performed on content stored within a first subdocument of the plurality of subdocuments and a second subdocument of the plurality of subdocuments; and
based on one or more compound document declarations that are stored separate from the plurality of compound documents, making a determination that the particular operation is permitted for the first subdocument and is not permitted for the second subdocument.

10. The method of claim 1, further comprising:
receiving an expand operation that includes an operand that references one or more elements in a subdocument of the plurality of subdocuments, wherein the operand does not refer to any resource path of the subdocument.

11. The method of claim 1, further comprising:
receiving an expand operation that includes an operand that specifies one or more subdocuments of the plurality of subdocuments to expand;
in response to receiving the expand operation, expanding only the one or more subdocuments but not any other subdocument of the plurality of subdocuments.

12. The method of claim 1, further comprising:
storing first access control policies for a first subdocument of the plurality of subdocuments;
storing second access control policies for a second subdocument, of the plurality of subdocuments, that is different than the first subdocument, wherein the second access control policies are different than the first access control policies.

13. The method of claim 1, further comprising:
storing first access control policies for the compound document;
storing second access control policies for a particular subdocument of the plurality of subdocuments, wherein the second access control policies are different than the first access control policies.

14. The method of claim 1, further comprising:
storing, in a first compound declaration, one or more first access control policies for a first part of the compound document;
storing, in a second compound declaration, one or more second access control policies for a second part of the compound document, wherein the one or more second access control policies are different than the one or more first access control policies.

15. The method of claim 1, further comprising:
checking out a version of the parent document without checking out any subdocument of the plurality of subdocuments; or
checking out a subdocument of the plurality of subdocuments without checking out any other subdocument of the plurality of subdocuments.

16. The method of claim 1, further comprising:
storing a plurality of versions of a particular subdocument of the plurality of subdocuments;
in response to determining to expand the compound document:
  identifying, in the parent document, a link to the particular subdocument of the plurality of subdocuments;
  retrieving a particular version of the plurality of versions of the particular subdocument.

17. The method of claim 16, further comprising:
if the link to the particular subdocument is version independent, then the particular version is the most current version of the plurality of versions;
if the link to the particular subdocument is version specific, then the particular version is the version that is referred to by the link, wherein the particular version is not the most current version of the plurality of versions.

18. One or more non-transitory storage media storing instructions which, when executed by one or more processors, cause:
in response to receiving a source document:
creating, based on the source document, a parent document that is separate from the source document;
identifying multiple elements within the source document;
creating a plurality of subdocuments that are separate from the parent document and the source document;
for each element of the multiple elements:
storing said each element in a different subdocument of the plurality of subdocuments,
creating and storing, in the parent document, a link to the different subdocument;
storing data that identifies the parent document and the plurality of subdocuments as a compound document that is separate from the source document;
wherein identifying the multiple elements within the source document comprises determining, based on one or more shredding instructions, a location of each element of the multiple elements in the source document;
wherein storing said each element of the multiple elements in the different subdocument comprises extracting said each element from the source document and storing said each element of the multiple elements at a resource path and a name of a corresponding subdocument, wherein the resource path and name of the corresponding subdocument are included in the one or more shredding instructions;
wherein the resource path comprises directories or nodes in a node hierarchy and does not include any of the multiple elements from the source document.

19. The method of claim 1, wherein the one or more shredding instructions specify the location of each element of the multiple elements.

20. A system comprising:
one or more processors;
one or more non-transitory storage media storing instructions which, when executed by the one or more processors, cause:
in response to receiving a source document:
creating, based on the source document, a parent document that is separate from the source document;
identifying multiple elements within the source document;
creating a plurality of subdocuments that are separate from the parent document and the source document;
for each element of the multiple elements:
storing said each element in a different subdocument of the plurality of subdocuments,
creating and storing, in the parent document, a link to the different subdocument;
storing data that identifies the parent document and the plurality of subdocuments as a compound document that is separate from the source document;
wherein identifying the multiple elements within the source document comprises determining, based on one or more shredding instructions, a location of each element of the multiple elements in the source document;
wherein storing said each element of the multiple elements in the different subdocument comprises extracting said each element from the source document and storing said each element of the multiple elements at a resource path and a name of a corresponding subdocument, wherein the resource path and name of the corresponding subdocument are included in the one or more shredding instructions;
wherein the resource path comprises directories or nodes in a node hierarchy and does not include any of the multiple elements from the source document.

* * * * *